United States Patent
Takeuchi et al.

(10) Patent No.: US 11,086,287 B2
(45) Date of Patent: Aug. 10, 2021

(54) MACHINE TOOL AND CONTROL METHOD OF MACHINE TOOL

(71) Applicant: FANUC CORPORATION, Yamanashi (JP)

(72) Inventors: Naoya Takeuchi, Yamanashi (JP); Tetsushi Takahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/901,142

(22) Filed: Jun. 15, 2020

(65) Prior Publication Data
US 2021/0003987 A1  Jan. 7, 2021

(30) Foreign Application Priority Data

Jul. 5, 2019  (JP) .............................. JP2019-126096

(51) Int. Cl.
| | |
|---|---|
| *G05B 19/402* | (2006.01) |
| *B23Q 15/12* | (2006.01) |
| *G05B 19/416* | (2006.01) |
| *B23Q 15/22* | (2006.01) |
| *B23Q 15/013* | (2006.01) |

(52) U.S. Cl.
CPC ......... *G05B 19/402* (2013.01); *B23Q 15/013* (2013.01); *B23Q 15/12* (2013.01); *B23Q 15/22* (2013.01); *G05B 19/4166* (2013.01); *G05B 2219/33099* (2013.01); *G05B 2219/37355* (2013.01)

(58) Field of Classification Search
None
See application file for complete search history.

(56) References Cited

U.S. PATENT DOCUMENTS

| | | | |
|---|---|---|---|
| 5,888,037 A | 3/1999 | Fujimoto et al. | |
| 8,629,641 B2* | 1/2014 | Fujishima | G05B 19/416 318/561 |
| 10,414,010 B2* | 9/2019 | Sannomiya | B23B 25/02 |
| 2021/0008630 A1* | 1/2021 | Kobayashi | B23Q 39/028 |

FOREIGN PATENT DOCUMENTS

| | | |
|---|---|---|
| EP | 0801339 A1 | 10/1997 |
| JP | H09120310 A | 5/1997 |
| JP | 2008046913 A | 2/2008 |
| JP | 2017004300 A | 1/2017 |

\* cited by examiner

*Primary Examiner* — Ryan A Jarrett
(74) *Attorney, Agent, or Firm* — Karceski IP Law, PLLC

(57) ABSTRACT

The machine tool includes a table, a spindle, first and second feed motors relatively moves the table and the spindle in a first direction and a second direction, and a control unit which positions cutting positions of a workpiece with respect to a tool by controlling the first feed motor, and moves a distal end of the tool between a distant position and a predetermined depth position of the workpiece by controlling the second feed motor, and the control unit performs a process in which the cutting position is positioned after cutting of the cutting position is completed, a second process in which the distal end of the tool is moved from the distant position to the predetermined depth position, and a third process in which the distal end of the tool is moved from the predetermined depth position to the distant position.

7 Claims, 6 Drawing Sheets

MACHINE TOOL AND CONTROL METHOD OF MACHINE TOOL

CROSS-REFERENCE TO RELATED APPLICATIONS

This application is based on and claims priority to Japanese Patent Application No. 2019-126096, filed on Jul. 5, 2019, the entire content of which is incorporated herein by reference.

FIELD OF THE INVENTION

This invention relates to a machine tool and a control method of the machine tool.

BACKGROUND OF THE INVENTION

Conventionally, in the machine tool, by optimizing a path of relative movement of a tool with respect to a workpiece, cycle time for cutting is shortened (for example, see Japanese Unexamined Patent Application, Publication No. 2017-004300, Japanese Unexamined Patent Application, Publication No. H09-120310, and Japanese Unexamined Patent Application, Publication No. 2008-046913). In the three references, movement of the tool with respect to the workpiece in a vertical direction and that in a horizontal direction are temporally overlapped with each other so that the movement path of the tool with respect to the workpiece is in a smoothly curved line. For example, in Japanese Unexamined Patent Application, Publication No. H09-120310, after drilling at a cutting position is completed, movement of a table, on which the workpiece is arranged, in an X-axis direction is started before lifting movement of the tool in a Z-axis direction is completed. And, before the movement of the table in the X-axis direction is completed, the tool is started to be lowered in the Z axis direction.

SUMMARY OF THE INVENTION

An aspect of the present invention is a machine tool including a table which holds a workpiece; a spindle which holds a tool; a first feed motor which relatively moves the table and the spindle in a first direction which intersects a longitudinal direction of the spindle; a second feed motor which relatively moves the table and the spindle in a second direction which is along the longitudinal direction of the spindle; and, a control unit which controls the first motor to relatively move the table and the spindle so as to position a first cutting position and a second cutting position of the workpiece with respect to the tool, and which controls the second motor to relatively move the table and the spindle so as to move a distal end of the tool between a distant position which is located away from the workpiece and a predetermined depth position of the workpiece, wherein, the control unit sequentially performs: a first process in which the second cutting position is positioned with respect to the tool after cutting of the first cutting position is completed; a second process in which the distal end of the tool is moved from the distant position to the predetermined depth position of the workpiece, and, a third process in which the distal end of the tool is moved from the predetermined depth position of the workpiece to the distant position, and wherein the control unit is configured to: relatively move the table and the spindle simultaneously in the first direction and the second direction while the distal end of the tool moves from the distant position to a reference position, which is located between the distant position and the workpiece by starting the second process before completion of the first process; and relatively move the spindle and the table simultaneously in the first direction and the second direction while the distal end of the tool moves from the reference position to the distant position by starting the first process before completion of the third process, and, controls speed of the relative movement between the table and the spindle in the third process based on the predetermined depth position and distance in the first direction between the first cutting position and the second cutting position.

DESCRIPTION OF EMBODIMENT(S) OF THE INVENTION

A machine tool 1 in accordance with a first embodiment will be described below with reference to the accompanying drawings.

Figure 1:
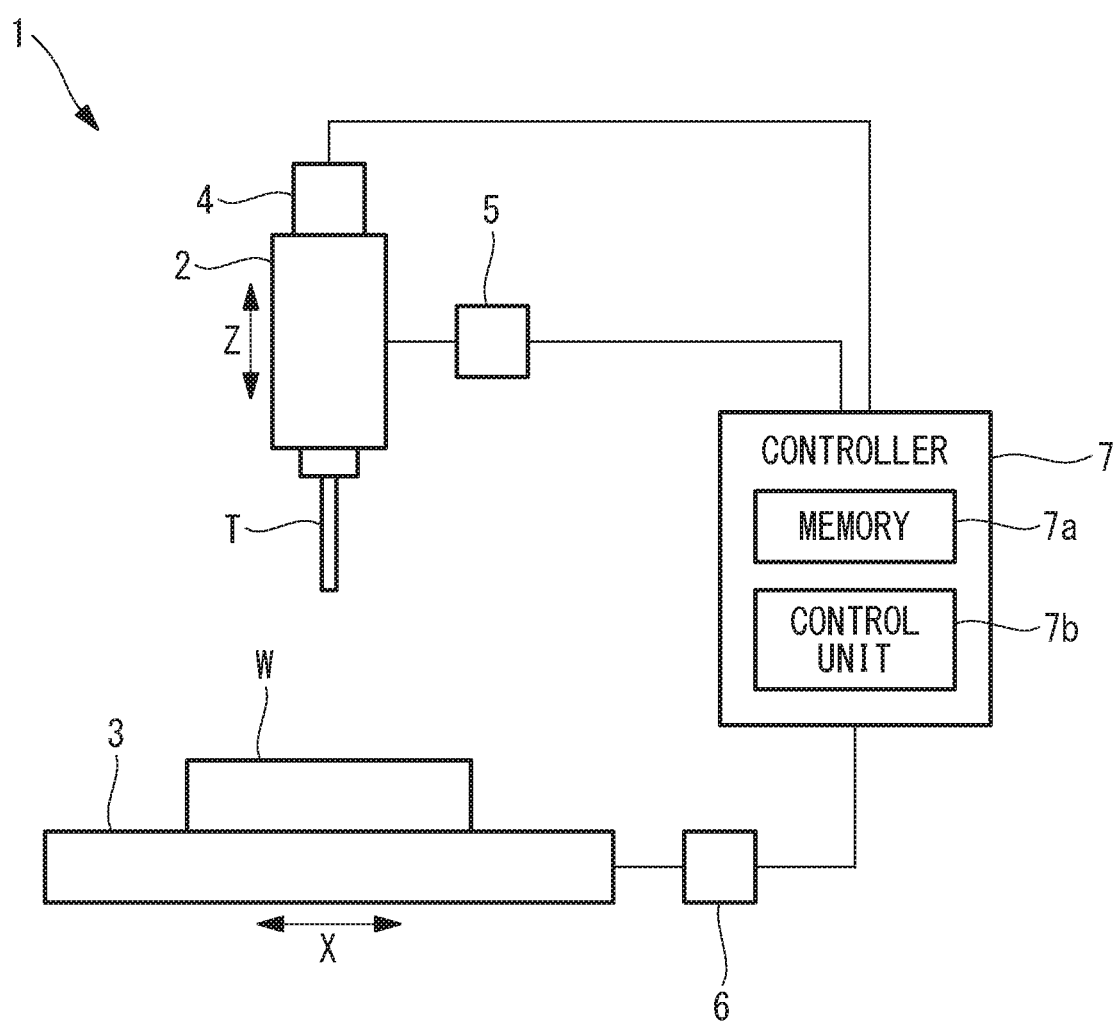
FIG. 1 is a schematic configuration view of a machine tool according to an embodiment of the present invention.

For example, the machine tool 1 includes a tool magazine which stores a plurality of tools, and a spindle which holds a the tool, and the machine tool 1 is a machining center having a function of automatically changing tools between the tool magazine and the spindle. As shown in FIG. 1, the machine tool 1 includes a spindle 2 which holds a tool T, a table 3 which holds a workpiece W, a spindle motor 4 which rotates the spindle 2, a Z-axis feed motor (a second feed motor) 5 which moves the spindle in a Z direction (a second direction) with respect to the table 3, X-axis feed motor (a first feed motor) 6 which moves the table 3 in a X-direction (a first direction) with respect to the spindle 2, and a controller 7 which controls motors 4, 5, 6. The Z-direction is a direction which is along the longitudinal axis of the spindle 2 and the tool T which is held by the spindle 2, and the X-direction is a direction which is orthogonal to the longitudinal direction of the spindle 2 and the tool T which is held by the spindle 2.

The spindle 2 is arranged in a vertical direction, and is supported by a support mechanism, which is not shown, so as to be movable in the vertical direction. Therefore, in the machine tool 1 of FIG. 1, the Z direction is the vertical direction, and the X direction is a horizontal direction. The spindle 2 holds the tool T at a lower end portion. The tool T and the spindle 2 are coaxial, and the tool T integrally rotates and moves with the spindle 2. The tool T is a drill which drills a hole H in the workpiece W in a depth direction (a Z direction). The tool T may be other type tools for cutting the workpiece in the depth direction, such as a milling cutter, an end mill, and the like.

The table 3 is arranged at the lower side of the spindle 2 to extend in a horizontal direction. The workpiece W which is arranged on the upper surface of the table 3 is fixed to the table 3 by means of a jig, which is not shown.

A spindle motor 4 is a spindle motor which is connected to an upper end of the spindle 2, and which rotates the spindle 2 around a longitudinal axis of the spindle 2.

Each of the Z-axis feed motor 5 and the X-axis feed motor 6 is a servo motor. A Y-axis feed motor which moves the table 3 in the Y direction may further be provided. The Y direction is a horizontal direction which is orthogonal to the Z direction and the X direction.

The controller 7 is a numerical controller, for example. The controller 7 has a memory 7a and a control unit 7b.

Figure 2:
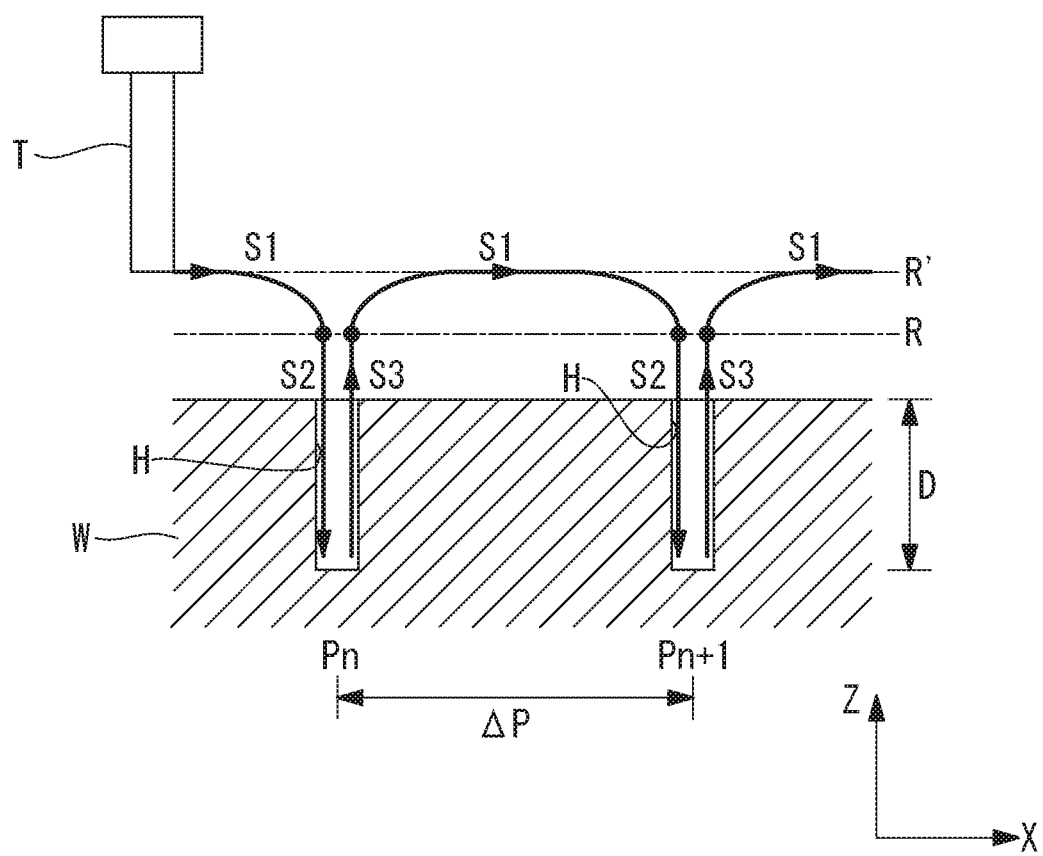
FIG. 2 is a diagram explaining a movement path of a tool with respect to a workpiece when movement of a spindle is controlled in a first control mode, in drilling the workpiece.
Figure 3:
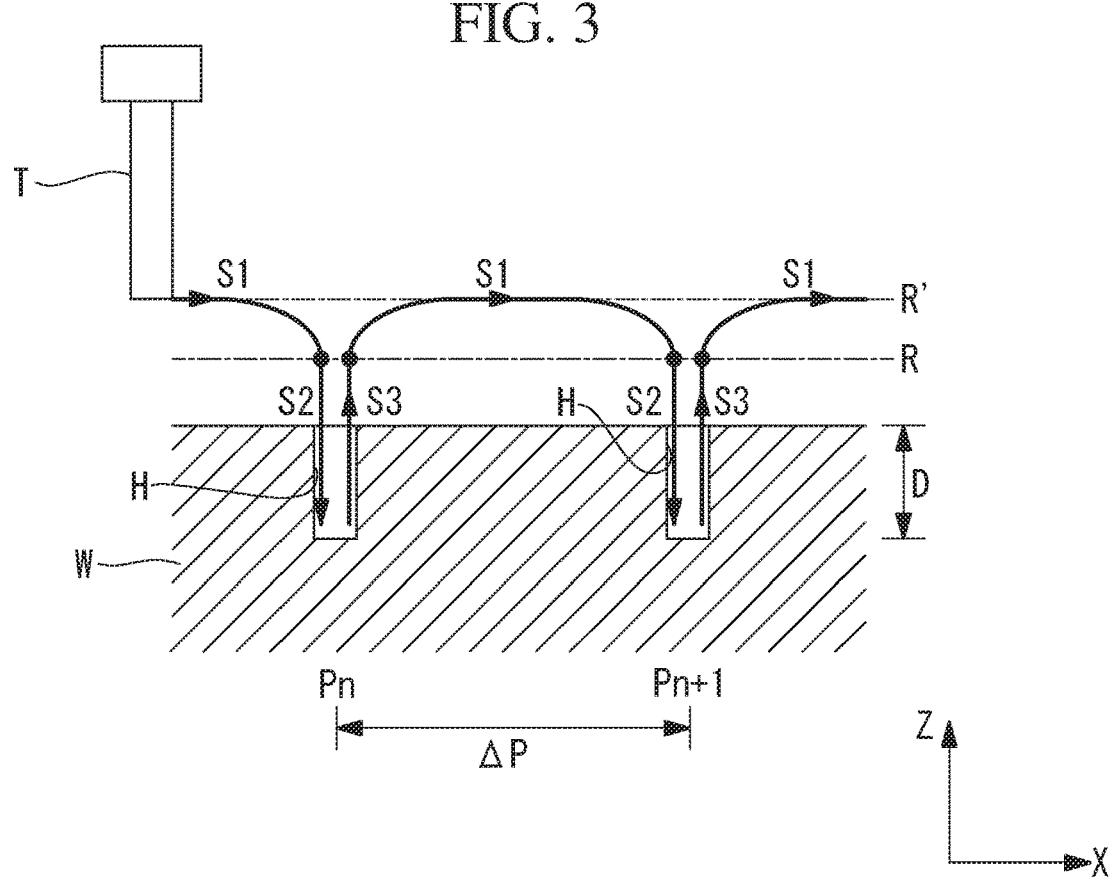
FIG. 3 is a diagram explaining the movement path of the tool with respect to the workpiece when the movement of the spindle is controlled in a second control mode, in drilling the workpiece.
Figure 4:
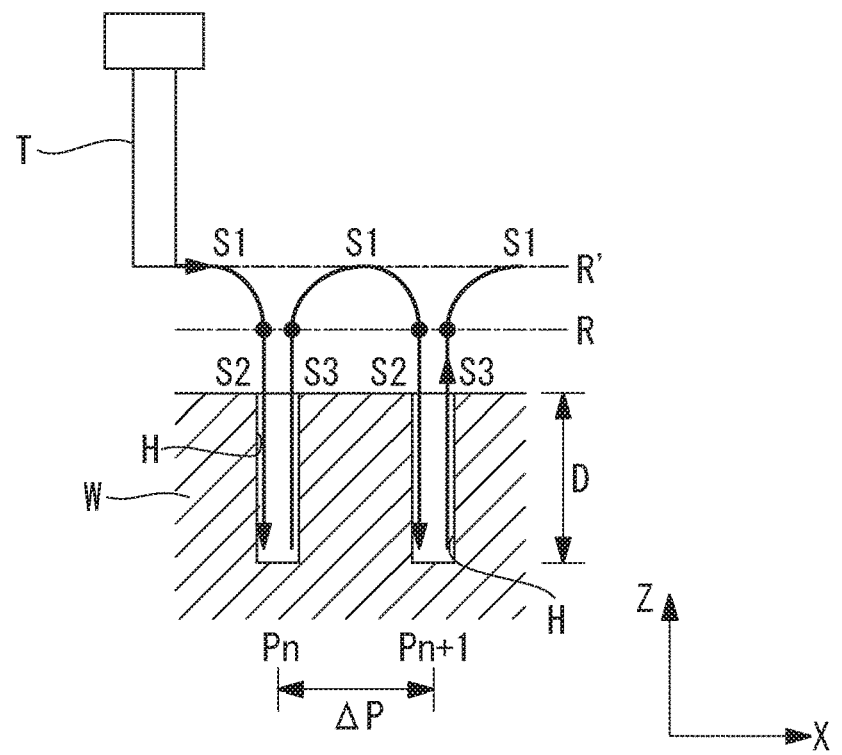
FIG. 4 is a diagram explaining the movement path of the tool with respect to the workpiece when the movement of the spindle is controlled in a third control mode, in drilling the workpiece.

The control unit 7a has a memory device, such as a RAM, a ROM, and the like. As shown in FIGS. 2 to 4, a cutting program is stored in the memory 7a so as to sequentially perform drilling on a plurality of cutting positions Pi (i=1, 2, ..., n, n+1, ...) on the workpiece W. The plurality of cutting positions Pi are arranged in the X direction with an interval $\Delta P$ therebetween.

A control unit 7b has a processor which is like a central processing unit. The control unit 7b controls movement of the spindle 2 and the table 3 by sending control signals to the motors 4, 5, 6 in accordance with the cutting program, so that drilling is sequentially performed on the plurality of cutting positions Pi on the workpiece W by means of the tool T.

Specifically, the control unit 7b moves the table 3 in the X direction, stops the table 3 temporarily, and repeats these steps so as to position each of the cutting positions Pi on the workpiece W at a vertically lower side of the tool T by controlling the X-axis feed motor 6. Also, the control unit 7b rotates the spindle 2 by controlling the spindle motor 4. Also, the control unit 7b repeatedly lowers and lifts the spindle 2 in the Z axis direction so that a distal end of the tool T reciprocates between a point R' and a position of a predetermined depth position of the workpiece W, which corresponds to a bottom of the hole, by controlling the Z-axis feed motor 5. The point R' (distant position) is a position higher than the upper surface of the workpiece W, and also is a position where the distal end of the tool T is located away from the workpiece after performing the drilling on each of the cutting positions Pi.

Next, a method for controlling the motors 4, 5, 6 by means of the control unit 7b in accordance with the cutting program will be described in detail.

As shown in FIGS. 2 to 4, the control unit 7b repeatedly performs a first process S1, a second process S2, a third process S3 sequentially. FIGS. 2 to 4 show a path of relative movement of the tool T with respect to the workpiece W.

In the first process S1, the control unit 7b moves the table 3 in the X direction in a fast-speed moving mode by means of the X-axis feed motor 6, and positions a first cutting position P1 of the workpiece W vertically under the tool T. In a case where the cutting position is a second or later cutting positions, the control unit 7b moves the table 3 in the X direction in the first-speed moving mode by means of the X-axis feed motor 6, after drilling a cutting position (a first cutting position) Pn (n=1, 2, 3, ...), so that a subsequent cutting position (a second cutting position) Pn+1 of the workpiece W vertically under the tool T.

In the fast-speed moving mode, the X-axis motor 6 moves the table 3 in the X direction at a fast speed. The fast speed is the fastest speed of the table 3 which can be achieved by the X-axis feed motor 6. Also, in the fast-speed moving mode, the X-axis feed motor 6 accelerates the table 3 so as to be the fast speed at the maximum acceleration of the X-axis feed motor 6, and decelerates the table 3 from the fast speed at the maximum deceleration of the X-axis feed motor 6.

Next, in a second process S2, the control unit 7b lowers a position of the spindle 2 by means of the Z-axis feed motor 5, and lowers a position of the distal end of the tool T from the point R' to a predetermined depth position of the workpiece W. By this, the hole H having a predetermined depth D is made on the cutting position P1 or the cutting position Pn+1 of the workpiece W. At this time, the control unit 7b accelerates the spindle 2 so that moving speed of the spindle 2 reaches a cutting feed speed before the distal end of the tool T reaches the point R, and after that, the position of the tool T is lowered so as to reach the predetermined depth position of the workpiece W by the cutting feed. The point R (reference position) is a position which is located between the upper surface of the workpiece W and the point R', and is also a position higher than the upper surface of the workpiece W. For example, a space in the Z direction, which is located between the upper surface of the workpiece W and the point R, is 1 mm to 5 mm. In the cutting feed, the Z-axis feed motor 5 moves the spindle 2 in the Z direction at the cutting feed speed which is sufficient for drilling the workpiece W by means of the tool T.

Next, in the third process S3, the control unit 7b lifts the spindle 2 while accelerating the spindle 2 by means of the Z-axis feed motor 5, and the control unit 7b lifts the distal end of the tool T from the bottom of the hole to the point R. By this, the tool T is pulled out from the hole H, and the distal end of the tool T is located away from the work W an located at a height position where the distal end of the tool T does not contact the workpiece W.

Here, the control unit 7b moves the spindle 2 in the Z direction in a state where the table 3 is temporarily stopped during a period of time when the position of the distal end of the tool T is lowered and lifted between the point R and the bottom of the hole. Also, the control unit 7b simultaneously moves the spindle 2 and the table 3 in the Z direction and the X direction during the period of time when the position of the distal end of the tool T is lowered and lifted between the point R and the point R'.

More specifically, the control unit 7b stars lowering the spindle 2 in the second process S2 before the positioning of the cutting position Pn+1 of the workpiece W in the first process S1 is completed so that the distal end of the tool T reaches the point R before the time when the positioning of the cutting position Pn+1 of the workpiece W is completed. By this, the movement of the table 3 in the X direction and that of the spindle 2 in the Z direction are temporally overlapped with each other until the distal end of the tool T reaches the point R from the point R', and movement path of the distal end of the tool T with respect to the workpiece W from the point R' to the point R becomes a circular arc shape or a substantially circular arc shape.

Also, the control unit 7b stars moving the table 3 in the subsequent first process S1 before the movement of the tool T of the third process S3 is completed. More specifically, the control unit 7b stars moving the table 3 at the time when the distal end of the tool T reaches the point R. By this, the movement of the spindle 2 in the Z direction and that of the table 3 in the X direction are temporally overlapped with each other until the distal end of the tool T reaches the point R' from the point R, and the movement path of the distal end of the tool T with respect to the workpiece W from the point R to the point R' becomes the circular arc shape or the substantially circular arc shape.

Further, as shown in FIGS. 2 to 4, the control unit 7b controls the acceleration and the movement speed of the spindle 2 in the third process S3 by any of a first control mode, a second control mode, and a third control mode on the basis of the predetermined depth position and distance ΔP which is between the cutting positions Pn and Pn+1. It is automatically determined which one of the first control mode, the second control mode, and the third control mode to be chosen by the control unit 7b on the basis of the cutting program, or it is determined by the user, and the user sets the controller 7 accordingly.

As shown in FIG. 2, the first control mode is chosen when the hole H is relatively deep, and also, when the distance ΔP, which is between the cutting positions Pn and Pn+1, is relatively large. More specifically, the first control mode is chosen when the predetermined depth position is a depth position which is sufficient for accelerating the tool T to the fast speed until the distal end of the tool T reaches the point R in the third process S3, and also, the distance ΔP is distance in which reverse time of the spindle 2 becomes less than or equal to time to position the table 3.

The spindle 2 is decelerated while the position of the distal end of the tool T is lifted from the point R to the point R', the moving direction of the spindle 2 is reversed when the distal end of the tool T is positioned at the point R', and the spindle 2 is accelerated to the cutting feed speed while the position of the distal end of the tool T is lowered from the point R' to the point R. The reverse time of the spindle 2 is the shortest time necessary for the distal end of the tool T, which has passed the point R at the fast speed in the third process S3, to pass the point R at the cutting feed speed in the subsequent process S2.

In the first process S1, the time to position the table 3 is time from the time when the table is started to move and until the time when the subsequent cutting position Pn+1 is positioned.

That is to say, the distance, at which the reverse time of the spindle 2 becomes less than or equal to the time to position the table 3, is distance which is sufficient for the distal end of the tool T, which has passed the point R at the fast forwarding speed in the third process S3, in order to pass the point R at the cutting feed speed before the positioning of the cutting position Pn+1 is completed in the subsequent second process S2.

In the first control mode, the control unit 7b lifts the position of the spindle 2 at the fast speed until the distal end of the tool T reaches to the point R from the bottom of the hole.

Figure 5:
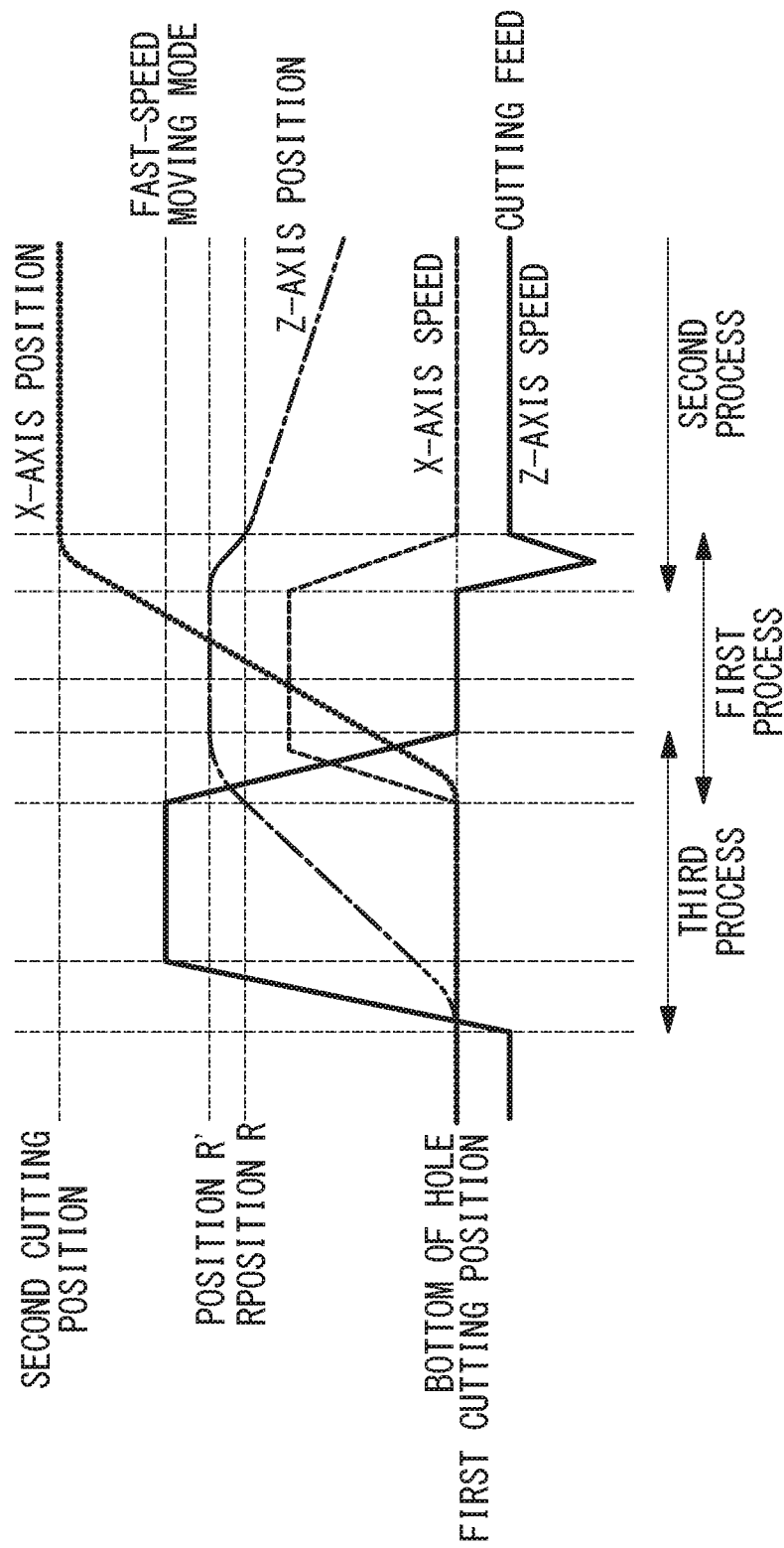
FIG. 5 is a graph showing change in time of speed and positions of the spindle and a table in the first control mode of FIG. 2.

That is to say, the control unit 7b controls the Z-axis feed motor 5 so that the spindle 2 is accelerated to the fast speed at the maximum acceleration, the spindle 2 is kept at the fast speed until the distal end of the tool T passes the point R, and the spindle 2 is decelerated after the distal end of the tool T has passed the point R. The fast speed is the maximum speed which can be achieved by the Z axis feed motor 5, and the cutting feed speed is slower than the fast speed. In one example, the fast speed of the spindle 2 is 45 m/min, and the cutting speed of the spindle 2 is 10 m/min to 30 m/min. FIG. 5 shows a change in time of the speed and the positions of the shaft 2 (Z axis) and the table 3 (X axis) in the first control mode. In FIG. 5, the horizontal axis represents time.

As shown in FIG. 3, the second control mode is chosen when the hole H is relatively shallow, and also, when the distance ΔP between the cutting positions Pn and Pn+1 is relatively large. More specifically, the second control mode is chosen when, in the third process S3, the depth position is not sufficient enough to accelerate the tool T to the fast speed before the distal end of the tool T reaches the point R, and also, when the distance ΔP is large where the reverse time of the spindle 2 becomes less than or equal to the time to position the table 3.

In the second control mode, the control unit 7b controls the Z-axis feed motor 5 so that the spindle 2 is accelerated to the point R at the maximum acceleration, and the spindle 2 is decelerated after the distal end of the tool T has passed the point R. Therefore, elevation speed of the spindle 2 at the point R is slower than the fast speed.

As shown in FIG. 4, the third control mode is chosen when the distance ΔP between the cutting positions Pn and Pn+1 is relatively close, regardless of the degree of the depth D of the hole H. More specifically, the third control mode is chosen when the distance ΔP is a distance where the reverse time of the spindle 2 is greater than the time to position the table 3, that is to say, this mode is chosen when the distance ΔP is distance which is not sufficient enough for the distal end of the tool T, which has passed the point R at the fast speed in the third step, to pass the point R at the cutting feed speed before the positioning of the cutting position Pn+1 is completed, in the subsequent second process S2.

In the third control mode, the control unit 7b accelerates the spindle 2 at the maximum acceleration, and stars to decelerate the spindle 2 before the distal end of the tool T reaches the point R. The deceleration of the spindle 2 at this time is preferably the maximum deceleration of the Z-axis feed motor 5. When to start the deceleration is determined on the basis of the distance ΔP, and the closer the distance ΔP is, the sooner the deceleration starts.

Next, operation of the machine tool 1 will be explained.

The control unit 7b moves the table 3 in the X direction, temporarily stops the movement of the table 3 by means of the X-axis feed motor, and repeats those procedures, so as to sequentially position a plurality of cutting positions Pi of the workpiece W at a vertically downward side of the tool T. Also, the control unit 7b synchronizes the movement of the table 3, while rotating the spindle 2 and the tool T by a spindle motor 4, lowering and lifting of the position of the spindle 2, which are repeated, in the Z direction by the Z-axis feed motor 5. By this, the hole H is formed sequentially on the plurality of the cutting portions Pi by the tool T.

Here, during the period in which the distal end of the tool T moves between the point R' and the point R in the Z direction, the movement of the spindle 2 in the Z direction and that of the table 3 in the X direction are temporally overlapped with each other. When compared with a case where the second process S2 is started after completion of the entire first process S1 and the subsequent first process S1 is started after completion of the entire third process S3, The aforementioned process is possible to shorten cycle time.

Also, in the third process S3, the control mode is chosen on the basis of the predetermined depth position and the distance ΔP, which is between the cutting positions Pn and Pn+1, and the spindle 2 is accelerated to the maximum speed which is allowed within the time to position the table 3. By this, it is possible to move the table 3 at any time at the fast speed regardless of the cutting conditions D and ΔP, and it is also possible to further shorten the cycle time.

Also, the point R is set at a higher position relative to the upper surface of the workpiece W, and the movement path of the distal end of the tool T becomes the circular arc shape or the substantially circular arc shape. By this, regardless of unevenness in thickness of the workpieces W, it is possible to prevent the distal end of the tool T, which moves along the path in the circular arc shape or in the substantially circular arc shape, from contacting an edge of an opening portion of the hole.

In the above described embodiment, each of the acceleration and the deceleration of the spindle 2 between the point R and the point R' in the first control mode may be smaller than the maximum acceleration and the maximum deceleration, within a range which does not affect the cycle time.

In such a case where the deceleration is smaller than the maximum deceleration, deceleration distance of the spindle 2 becomes longer, and the distance between the point R and the point R' in the Z direction becomes much larger, and the distal end of the tool T is located at a higher position.

The greater the acceleration and the deceleration become, the greater the power consumption and heat generation of the Z-axis feed motor 5 become. By reducing the acceleration and the deceleration of the spindle 2, it is possible to reduce the power consumption and the heat generation of the Z-axis feed motor 5.

Figure 6:
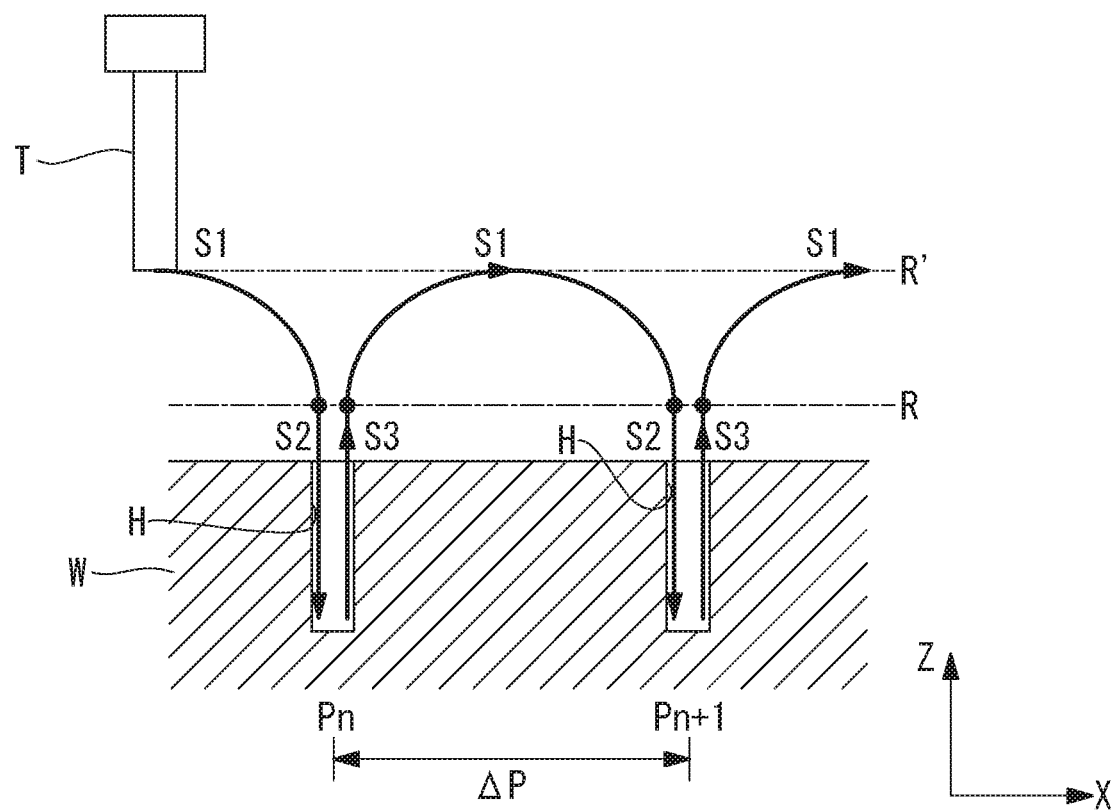
FIG. 6 is a diagram explaining a modified example of the movement path of the tool with respect to the workpiece when controlling the movement of the spindle in the first control mode, in drilling the workpiece.
Figure 7:
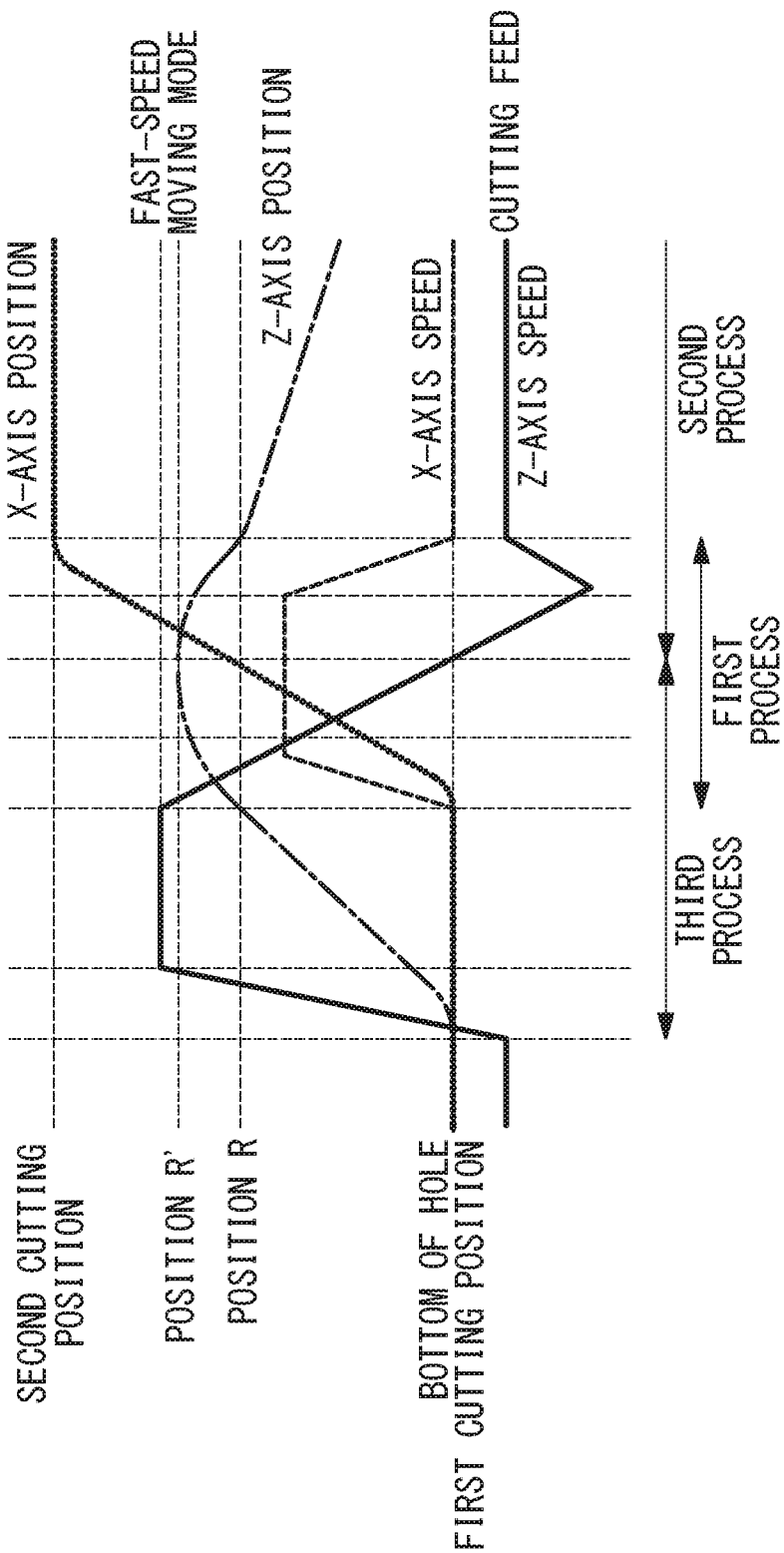
FIG. 7 is a graph showing the change in time of the speed and the positions of the spindle and the table in the first control mode of the FIG. 6.

For example, in FIG. 2, there is a time period in which the spindle 2 lineally moves in the horizontal direction with respect to the table 3 between the cutting positions Pn and Pn+1. On the other hand, as shown in FIG. 6, even in a case where the spindle 2 is decelerated at the reduced deceleration, and after that, the spindle 2 is accelerated at the reduced accelerated speed immediately, the cycle time is the same as that in the case of FIG. 2. FIG. 7 shows changes in time of the speed and the positions of the spindle 2 (Z axis) and the table 3 (X axis) in the first control mode of FIG. 6. In FIG. 7, the horizontal axis represents time.

As shown in FIG. 7, the deceleration and the acceleration between the point R and the point R' are determined such that the movement path of the tool T with respect to the workpiece W, which is between the point R and the point R', does not include the linear line, but the movement path forms the curved line which is in the gentle circular arc shape or in the substantially circular arc shape, for example. By this, the moving speed of the spindle 2 between deceleration and acceleration is gently changed in the maximum degree, which is within a range which does not cause extension of the cycle time, so that the power consumption and the heat generation is more effectively reduced.

The above described embodiment stated that the first direction is the X direction, however, the first direction may be any direction which is orthogonal to the depth direction of the workpiece W. That is to say, the first direction may be the Y direction, or it may be both of the X and Y directions.

In one example, in such a case where the plurality of cutting positions Pi are arranged in the Y direction, the control unit 7b may control the Y-axis feed motor (first feed motor), and may moves the table 3 in the Y direction, in the first process S1.

As another example, in such a case where the plurality of cutting positions P1 are second dimensionally arranged in the X direction and Y direction, the control unit 7b may simultaneously control both of the X-axis feed motor 6 and the Y-axis feed motor, and may move the table 3 in both of the X direction and Y direction, in the first process S1.

In the above described embodiment, the table 3 moves in the X direction and Y direction which intersect with the longitudinal direction of the spindle 2, however, the relative movement of the spindle 2 and the table 3 in the X direction and the Y direction may be achieved by movement of any one of, or both of the spindle 2 and the table 3. Similarly, in the above described embodiment, the spindle 2 moves in the Z direction which is along the longitudinal direction of the spindle 2, however, the relative movement of the spindle 2 and that of the table 3 in the Z direction may be achieved by movement of any one of, or both of the spindle 2 and the table 3. For example, instead of the feed motors 5, 6, a first motor for moving the spindle 2 in the X direction and the Y direction, and a second motor for moving the table 3 in the Z direction may be provided.

Also, in the above described embodiment, the first direction is the horizontal direction (X direction and Y direction), and the second direction is the vertical direction (Z direction), however, specific directions of the first direction and the second direction may appropriately be changed in response to specification of the machine tool. For example, in such a case where the machine tool is horizontally provided with the spindle 2, the second direction may be the horizontal direction, and the first direction may be any direction which intersects with the second direction.

The invention claimed is:
1. A machine tool comprising:
a table which holds a workpiece;
a spindle which holds a tool;
a first feed motor which relatively moves the table and the spindle in a first direction which intersects a longitudinal direction of the spindle;
a second feed motor which relatively moves the table and the spindle in a second direction which is along the longitudinal direction of the spindle; and,
a control unit which controls the first motor to relatively move the table and the spindle so as to position a first cutting position and a second cutting position of the workpiece with respect to the tool, and which controls the second motor to relatively move the table and the spindle so as to move a distal end of the tool between a distant position which is located away from the workpiece and a predetermined depth position of the workpiece, wherein,
the control unit sequentially performs:
a first process in which the second cutting position is positioned with respect to the tool after cutting of the first cutting position is completed;
a second process in which the distal end of the tool is moved from the distant position to the predetermined depth position of the workpiece; and
a third process in which the distal end of the tool is moved from the predetermined depth position of the workpiece to the distant position, and
wherein the control unit is configured to:
relatively move the table and the spindle simultaneously in the first direction and the second direction while the distal end of the tool moves from the distant position to a reference position, which is located between the distant position and the workpiece by starting the second process before completion of the first process; and
relatively move the spindle and the table simultaneously in the first direction and the second direction while the distal end of the tool moves from the reference position to the distant position by starting the first process before completion of the third process; and controls speed of the relative movement between the table and the spindle in the third process based on the predetermined depth position and distance in the first direction between the first cutting position and the second cutting position.

2. The machine tool according to claim 1, wherein the control unit relatively moves the table and the spindle at a fast speed in the first process.

3. The machine tool according to claim 2, wherein, in the third process, the control unit controls the second feed motor so that relative speed between the table and the spindle is accelerated to the fast speed and the distal end of the tool passes the reference position at the fast speed, in a case where the predetermined depth position is a depth position which is sufficient to accelerate the relative speed between the table and the spindle to the fast speed before the distal end of the tool reaches the reference position, and in a case where the distance between the first cutting position and the second cutting position is one which is sufficient for the distal end of the tool, which has passed the reference position at the fast speed in the third process, to pass the reference position at cutting feed speed, which is slower than the fast speed, before positioning of the second cutting position is completed in the subsequent second process.

4. The machine tool according to claim 3, wherein, the control unit accelerates the relative speed between the table and the spindle at an acceleration, which is a smaller acceleration than a maximum acceleration of the second feed motor, before the distal end of the tool reaches the reference position in the second process, and in the third process, the control unit decelerates the relative speed between the table and the spindle at a deceleration, which is a smaller deceleration than a maximum deceleration of the second feed motor, before the distal end of the tool passes the reference position.

5. The machine tool according to claim 2, wherein, in the third process, the control unit controls the second feed motor to accelerate the relative speed between the table and the spindle at the maximum acceleration of the second feed motor and start decelerating the relative speed between the table and the spindle before the distal end of the tool reaches the reference position in a case where the predetermined depth position is a depth position which is not sufficient to accelerate the relative speed between the table and the spindle to the fast speed before the distal end of the tool reaches the reference position, and also, in a case where the distance between the first cutting position and the second cutting position is one which is sufficient for the distal end of the tool, which has passed the reference position at the fast speed in the third process, to pass the reference position at cutting feed speed, which is slower than the fast speed, before the positioning of the second cutting position of the workpiece is completed in a subsequent second process.

6. The machine tool according to claim 2, wherein, in the third process, the control unit controls the second feed motor to accelerate the relative speed between the table and the spindle at the maximum acceleration of the second feed motor and start decelerating the relative speed of the table and the spindle before the distal end of the tool reaches the reference position, in a case where the distance between the first cutting position and the second cutting position is one which is not sufficient for the distal end of the tool, which has passed the reference position at the fast speed in the third process, to pass the reference position at the cutting feed speed, which is slower than the fast speed, before the positioning of the second cutting position of the workpiece is completed in the subsequent second process.

7. A control method of a machine tool in which a table for holding a workpiece and a spindle are moved in a first direction which intersects a longitudinal direction of the spindle so as to position a first cutting position and a second cutting position of the workpiece with respect to a tool which is held by the spindle, and the table and the spindle are moved in a second direction which is along the longitudinal direction of the spindle so as to move a distal end of the tool between a distant position, which is located away from the workpiece, and a predetermined depth position of the workpiece, the control method including:
a first process in which the second cutting position is positioned with respect to the tool after cutting of the first cutting position is completed;
a second process in which the distal end of the tool is moved from the distant position to the predetermined depth position of the workpiece;
a third process in which the distal end of the tool is moved from the predetermined depth position of the workpiece to the distant position, wherein the first to third process are performed sequentially;
relatively moving the table and the spindle simultaneously in the first direction and the second direction so that the distal end of the tool reaches a reference position, which is between the distant position and the workpiece, from the distant position by staring the second process before completion of the first process;
relatively moving the spindle and the table simultaneously in the first direction and the second direction so that the distal end of the tool reaches the distant position from the reference position by starting the first process before completion of the third process; and,
controlling the relative speed between the table and the spindle in the third process based on the predetermined depth position and distance in the first direction between the first cutting position and the second cutting position.

* * * * *